Inventor:
Henry J. Koeber

United States Patent Office 3,620,150
Patented Nov. 16, 1971

3,620,150
SINGLE KNOB CONTROL SEMIAUTOMATIC FOCUS DEVICE
Henry J. Koeber, Deerfield, Ill., assignor to
Bell & Howell Company, Chicago, Ill.
Filed Dec. 30, 1969, Ser. No. 889,214
Int. Cl. G03b 13/20
U.S. Cl. 95—44 C            7 Claims

ABSTRACT OF THE DISCLOSURE

This disclosure describes a single knob control semiautomatic focusing device for use on a camera. A cam attached to the knob impinges on a stud attached to the sliding lens sleeve of the camera. The stud is spring biased toward the cam. A free swinging pendulum having a cam surface is mounted so that the cam surface also impinges on the stud. Focus is achieved by rotating the knob in a first direction so that the cam moves the stud away from the cam surface of the pendulum (moves the attached lens sleeve through focus). The axis of the lens is then pointed toward the base of a remote object being focused on and the knob is released so that the stud moves to where it impinges on the cam surface of the pendulum. The stud is maintained in this "focus" position due to friction when the axis of the lens is returned to a generally horizontal or picture taking position. Further, the knob is adjustable for manual focus by scale by rotation in a second direction to cause a second cam surface to displace the stud and focus the lens independent of the orientation of the pendulum.

---

Various types of focusing devices for use on cameras and other types of optical equipment have been proposed and are in use. One common type is the dual beam range finder wherein two images of the same object are optically sensed and compared. One of the images is sensed through the lens of the camera and is moved or varied as the camera's lens is moved. When this image is coincident with the other image, focus is achieved. The problem with this and other types of optical focusing devices is that they require precision components which must be carefully mounted, thereby making the camera utilizing these devices expensive to manufacture.

More recent, and somewhat less expensive, focusing aids using a triangulation principle have been developed. These systems utilize a pendulum in combination with an indicating means. In use, the camera's lens is pointed at the base or foot of an object and the pendulum is allowed to swing so that it remains in vertical plane. The pendulum is then locked in place and the indicator is read. The indicator provides an indication of the distance from the object to the camera. Thereafter, the lens of the camera is adjusted to this distance. While, as previously stated, this system is less complex and, therefore, less costly than optical focusing devices, it has other disadvantages. For example, it is cumbersome to use because it requires a multitude of steps (i.e. pointing the camera at the foot of the object, locking the pendulum in place, reading the indicator and setting the lens). Not only is this procedure cumbersome, it is also time consuming. Hence, it is difficult to utilize a camera incorporating such a focusing aid to take candid photographs.

Therefore, it is an object of this invention to provide a new and improved focusing device for use on cameras and other optical systems.

It is a further object of this invention to provide a semiautomatic focusing device that utilizes a triangulation principle to focus a camera or other optical system.

It is yet another object of this invention to provide a semiautomatic focusing device for focusing a camera or other optical system that utilizes a triangulation principle but does not require the separate manual adjustment of the lens of the optical system.

It is a still further object of this invention to provide a semiautomatic triangulation type focusing device wherein the lens of the camera is connected to the focusing device so that as the focusing device is manipulated, the lens of the camera automatically changes focus.

In accordance with the principle of this invention, a semiautomatic focusing device for use on a camera or other optical system is provided. A cam is attached to a control knob and impinges on a stud attached to a sliding lens forming a part of the optical equipment. The stud is spring biased towards the cam. A free-swinging pendulum having a cam surface is mounted so that the cam surface impinges on the stud. Focus is achieved by rotating the knob so that the cam moves the stud away from the cam surface of the pendulum (and moves the lens sleeve through focus). The optical system is then pointed toward the foot of the object and the knob is released thereby allowing the stud to move to a point where it impinges on the surface of the pendulum cam. The curvature of the pendulum cam surface is such that the optical system is now in focus. After release, this position of the lens is maintained when the camera is moved from its previously downwardly pointed direction by friction between the pendulum cam surface and the stud.

It will be appreciated from the foregoing description that the invention provides a rather uncomplicated apparatus for semiautomatically focusing a camera or other optical system. By using appropriate cam curvatures, compensation for the user's height is provided so that the lens is exactly at focus. Because the invention utilizes mechanical components, as opposed to optical components, it is less expensive to manufacture. Moreover, because the invention connects a pendulum-triangulation system to movement of the lens, the disadvantages of prior art combinations of pendulum focus determining devices and manual lens movement are eliminated.

Further and other objects will be apparent from description of the accompanying drawings in which like numerals refer to like parts.

Figure 4:
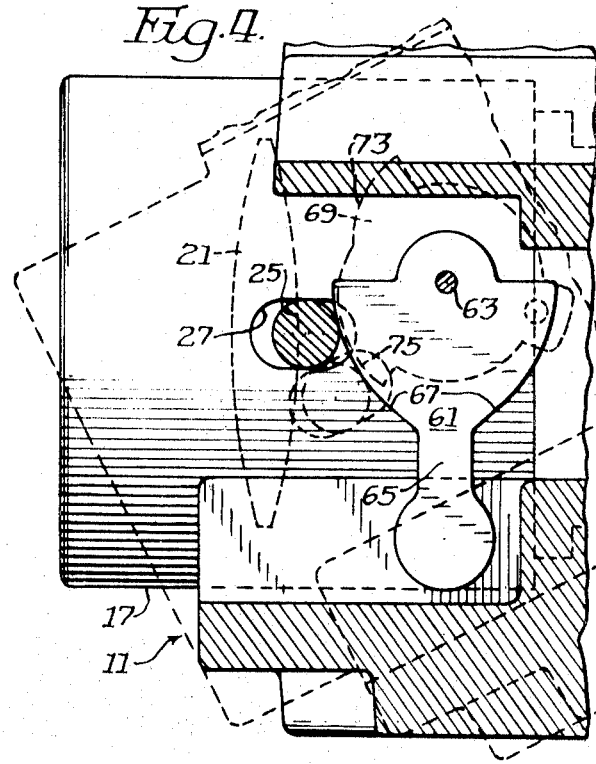
FIG. 4 is a cross-sectional view along line 4—4 of FIG. 2.

The embodiment of the invention illustrated in the drawings is mounted in a camera 11. The camera includes a housing 13 having an aperture 15 located in one side and adjacent to the lens system of the camera. The lens system includes a fixed lens barrel 17 that houses a sliding focus sleeve 19. The sliding focus sleeve 19 holds a lens 21. The fixed lens barrel 17 is fixedly attached to a portion 23 of the camera housing 13 by any suitable means. A stud 25 is threaded into the side of the sliding focus sleeve 19 and projects through an oval aperture 27 (FIG. 4) in the side of the fixed lens barrel 17 into the aperture 15 in the side of the camera.

Figure 3:
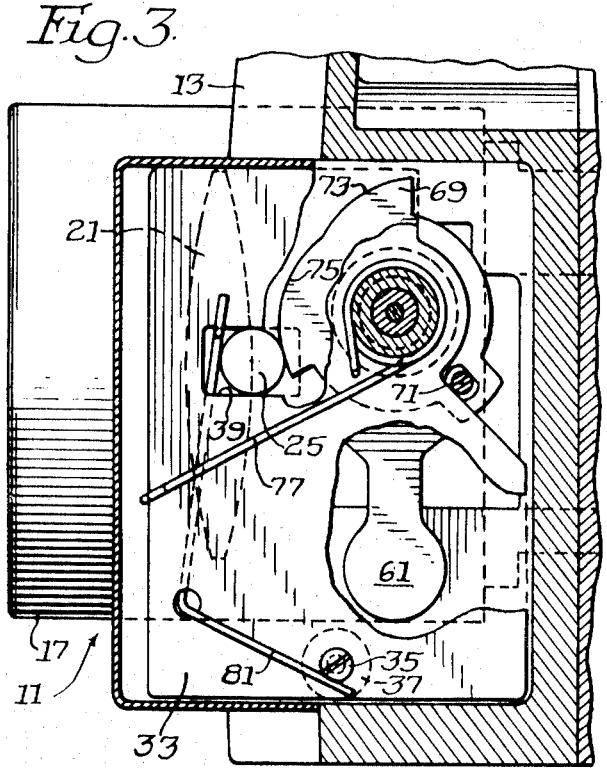
FIG. 3 is a cross-sectional view along line 3—3 of FIG. 2.
Figure 2:
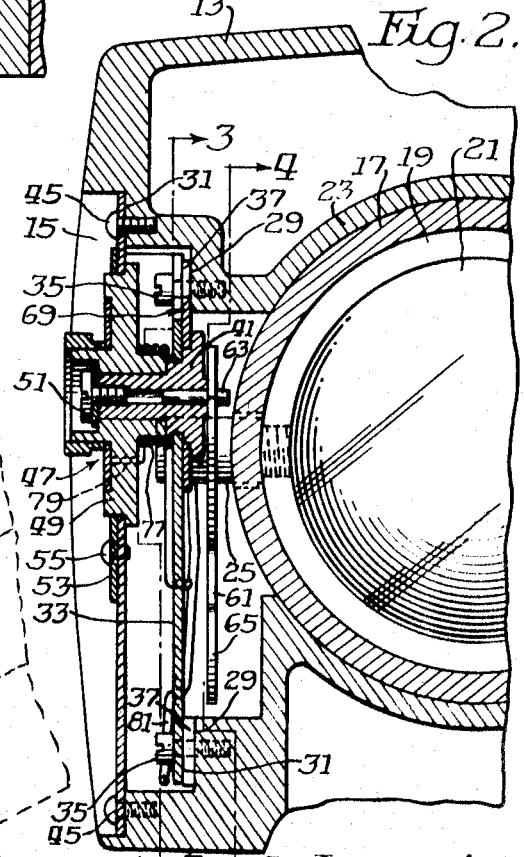
FIG. 2 is a cross-sectional view along line 2—2 of FIG. 1.

The aperture 15 is formed so as to have an inside pair of shoulders 29, 29 and an outside pair of shoulders 31 are viewed in FIG. 2. The inside pair of shoulders 29, 29 are closer to the fixed lens barrel 17 than are the outside pair of shoulders 31, 31. In addition, the inside pair of shoulders are closer to one another than are the outside pair of shoulders. A support plate 33 is attached to the inside pair of shoulders 29 by bolts 35. Washers 37 are mounted about the bolts between the support plate 33 and the inside pair of shoulders 29 so that the support plate 33 is separated from the inside pair of shoulders. The support plate 33 includes a rectangular aperture 39 best illustrated in FIG. 3 through which the end of the stud 25 passes.

A generally cylindrical bushing 41 passes through a cylindrical aperture in the support plate 33 and has an inside shoulder that rides on the inner side of the support plate 33. The bushing 41 is rotatably held in the cylindrical aperture in the support plate 33 in the manner hereinafter described.

Figure 1:
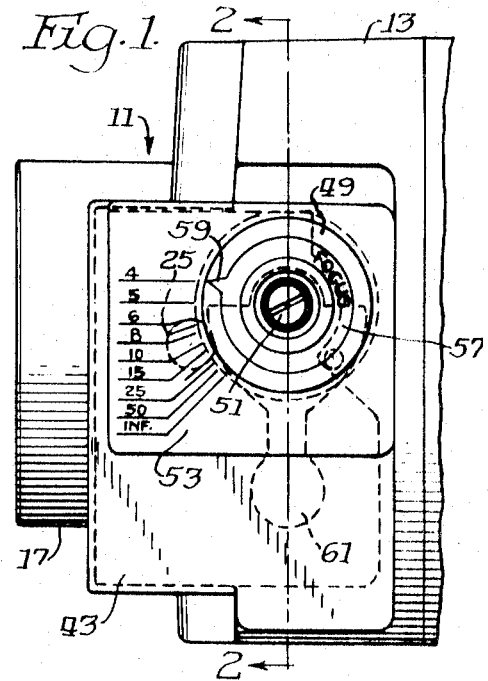
FIG. 1 is a sideview of a portion of a camera incorporating a preferred embodiment of the invention.

A cover plate 43 is attached to the outside pair of shoulders 31, 31 by bolts 45. A cylindrical aperture, aligned with the cylindrical aperture in the support plate 33 is formed in the cover plate 43. A control knob 47 passes through the cylindrical aperture in the cover plate 43. The control knob 47 includes a support section 49 that has a cylindrical centrally aligned aperture that fits over an outwardly extending cylindrical portion of the bushing 41. A boltwasher arrangement 51 is threaded into the outwardly extending cylindrical portion of the bushing 41 so as to attach the control knob 47 to the bushing. The support section 49 also has an outwardly extending region including a flange that rides on the inner side of the cover plate 43. On the outer side of the cover plate 43 is attached an indicator plate 53 best illustrated in FIG. 1. The indicator plate has a plurality of footage indications located on its outer surface. The indicator plate is attached to the cover plate 43 by any suitable means such as rivets 55 (FIG. 2). Attached to the control knob 47 and forming a part thereof is a ring shaped element 57 having an outwardly projecting pointer 59 that coacts with the footage indications located on the surface of the indicator plate 53.

A pendulum 61 is attached to the bushing 41 via a pin 63 and is located between the support plate 53 and the fixed lens barrel 12. The pendulum is freely swingable and includes a downwardly projecting pendulum section 65 and curved cam surface 67. The pendulum is mounted so that its front curved cam surface 67 can impinge on the stud 25.

Attached to the bushing 41 between the pendulum 61 and the support plate 53 is a cam 69. The cam is fixedly attached to the bushing 41 by a pin 71 best illustrated in FIG. 3. The cam 69 has two cam surfaces 73 and 75 located in the edge of the cam so that they can impinge on the stud 25.

The coils of a coil spring 77 are wrapped around the control knob 47 and the bushing 41 between the support plate 33 and the cover plate 43. One leg of the coil spring 77 projects outwardly and has a bent end that fits over the front edge of the support plate 33 as viewed in FIG. 3. The other leg of the coil spring 77 has a bent end that passes through an aperture 79 in the control knob 47. Mounting the coil spring in this manner tends to rotate the control knob 47 and its attached cam 69 in a clockwise direction.

A generally right angled wire spring 81 passes through an aperture in the support plate 33 at its angle point. One end of the wire spring 81 impinges on a bolt 35 that holds the cover plate 33 to the lower inside shoulder 29. The other end of the wire spring passes through the aperture 39 in the support plate 33 through which the stud 25 passes. The mounting of the wire spring 81 is such that it tends to force the stud 25 toward the cam surfaces 73 and 75 of the cam 69. Since the stud 25 is attached to the sliding focus sleeve 19, the action of the wire spring 81 also tends to move the lens 21 inwardly. Preferably, the force generated by the wire spring 81 is greater than the force generated by the coil spring 77.

Turning now to a description of the operation of the embodiment of the invention illustrated in the figures; to focus semiautomatically, the photographer sights through the camera's view finder at the base or foot of the subject to be photographed. He then rotates the knob 47 in a counterclockwise direction. This action rotates cam surface 73 of the cam 69 against the stud 25. This rotation pushes the stud 25 and its attached sliding focus sleeve 19 and lens 21 through focus. This rotation also frees the pendulum 61 so that it hangs vertically at some angle with respect to the photographic axis of the lens 21. The user than releases the control knob 47 and the action of the wire spring 81 moves the stud and the connected sliding focus sleeve toward the pendulum. When the stud contacts the front cam surface 67 of the pendulum it stops moving and the camera is in focus.

It will be approached by those skilled in the art that the curvature of the cam surface of the pendulum is calculated in terms of the ratio of lens focus rackout versus angle of pendulum. That is, by triangular mathematical computations, it can be shown that, when the pendulum angle from the lens axis and the height of the user are known, the distance along a horizontal line from the foot of the user to the foot of the object can be determined. By further computation the footage indication points on the surface of the indicator plate 53 and the curvature of the cam surface can be determined so that upon selected angles of inclination between the optical axis of the camera and a substantially horizontal line, the angle is translated into a distance indication. Thus, the angular orientation of the pendulum corresponds to a given distance, which distance is the focus distance. This, of course, assumes that the user of the camera is of "constant" height, which assumption is reasonable when considering the depth of field of a conventional camera.

When the control knob 47 is released, the coil spring rotates the knob and its connected cam 9 in a clockwise direction until cam surface 75 contacts the stud 25. At this point, as previously described, the stud is locked at the proper focus position by the pendulum's cam surface 67. The cam surace 75 is calculated in degrees of angular rotation versus lens rackout and is shown in terms of focus distance on the indicator scale. Hence, not only is the lens in focus, an indication of the distance from the user to the object being photographed is also provided.

Cam 75 also provides a focus lock in case the pendulum accidentally breaks loose from the stud 25. For example, if the camera is jarred or otherwise disturbed, the pendulum 61 may move away from the stud 25. However, because of cam surface 75, the lens remains in focus.

If desired, a camera using the invention can be manually focused by holding the optical axis of the camera slightly above the horizontal so that the pendulum cam hangs away from the stud 25. The control knob 47 is then rotated by hand until the pointer 59 indicates the desired distance on the scale. This rotation, due to the action of cam surface 75, moves the stud 25 and its attached sliding focus sleeve to the desired focus setting.

It will be appreciated from the foregoing description that the invention provides a rather uncomplicated apparatus for focusing a camera. Because it does not use optical components, it does not have to be as precisely formed as prior art optical systems. In addition, it is not as expensive to manufacture as prior optical focusing systems, particularly those of the dual beam range finding type. Moreover, the invention overcomes the problems of prior art triangular focusing systems because it automatically focuses the lens thereby doing away with a separate manual lens focusing step.

It will be appreciated by those skilled in the art and others that the foregoing description has described only a preferred embodiment of the invention and that various changes can be made within the scope of the invention.

The embodiments of the invention in which an exclusive property or privilege is claimed are defined as follows:

1. A focusing device for an optical instrument having a housing and a focusable lens with an axially adjustable lens portion, comprising:
   a stud attached to said axially adjustable lens portion;
   a pendulum mounted in said housing and having a cam surface arranged for engagement with said stud, said pendulum being free swinging when disengaged with said stud and being retained in an oriented position upon engagement by said stud; and control means including a cam member having a first cam surface and a second cam surface said first cam surface moving said stud away from said pendulum cam surface for free swinging orientation of said pendulum upon actuation of said control means in a first direction, and said second cam surface moving said stud to adjust said lens to a focused condition independent of said pendulum upon actuation of said control means in a second direction.

2. A focusing device as claimed in claim 1 wherein the cam surface of said pendulum is calculated in terms of the ratio of lens focus rackout versus angle of pendulum inclination and said second cam surface of said cam member is calculated in the degrees of angular rotation versus lens rackout.

3. A focusing device as claimed in claim 1 including a first spring for biasing said stud toward said cam surface of said pendulum.

4. A focusing device as claimed in claim 1 wherein said control means includes a knob attached to a cam member, said cam member and said knob being mounted so that said knob is reversibly rotatable and said cam surfaces of said cam member move said stud relative to said pendulum for causing focusing of said lens.

5. A focusing device as claimed in claim 1 including a spring means for rotating said control means and said cam member in the opposite direction of rotation from the direction necessary to move said stud away from said pendulum after actuation of said control means to displace said stud for free swinging conditioning of said pendulum.

6. A focusing device as claimed in claim 1 wherein said control means when actuated in said first direction moves said stud to engage with said pendulum cam surface to retain same in said oriented position.

7. A focusing device as claimed in claim 6 wherein said control means when actuated in said second direction moves said stud independent of said pendulum and maintains said stud in an adjusted position.

References Cited

UNITED STATES PATENTS 1,258,459   3/1918   Read _____ 95—44 C

SAMUEL S. MATTHEWS, Primary Examiner

E. M. BERO, Assistant Examiner

U.S. Cl. X.R.

350—41; 352—140; 353—101